(12) United States Patent
Novosselov et al.

(10) Patent No.: US 8,475,577 B2
(45) Date of Patent: Jul. 2, 2013

(54) OMNIDIRECTIONAL AEROSOL SAMPLING INTAKE

(75) Inventors: Igor V Novosselov, Seattle, WA (US); Peter C Ariessohn, Lake Tapps, WA (US)

(73) Assignee: ENERTECHNIX, Inc, Maple Valley, WA (US)

( * ) Notice: Subject to any disclaimer, the term of this patent is extended or adjusted under 35 U.S.C. 154(b) by 208 days.

(21) Appl. No.: 13/069,618

(22) Filed: Mar. 23, 2011

(65) Prior Publication Data

US 2011/0232498 A1 Sep. 29, 2011

Related U.S. Application Data

(60) Provisional application No. 61/317,192, filed on Mar. 24, 2010.

(51) Int. Cl.
    *B01D 49/00* (2006.01)
(52) U.S. Cl.
    USPC ............... 96/413; 55/434; 55/447; 55/385.1; 55/461; 73/863.21; 73/863.22
(58) Field of Classification Search
    USPC . 55/434, 447, 385.1, 461; 96/413; 73/863.21, 73/863.22
    See application file for complete search history.

(56) References Cited

U.S. PATENT DOCUMENTS

| 4,461,183 | A | | 7/1984 | Wedding |
| 5,040,424 | A | * | 8/1991 | Marple et al. ............. 73/863.23 |
| 5,317,930 | A | | 6/1994 | Wedding |
| 5,412,975 | A | * | 5/1995 | Raabe et al. ............... 73/28.04 |
| 6,530,287 | B1 | | 3/2003 | Rodgers |
| 7,334,453 | B2 | * | 2/2008 | Trakumas et al. ........... 73/28.05 |
| 7,503,230 | B2 | * | 3/2009 | Bell et al. .................. 73/863.21 |
| 2007/0044577 | A1 | * | 3/2007 | Trakumas et al. ......... 73/863.22 |
| 2007/0107538 | A1 | * | 5/2007 | Bell et al. .................. 73/863.21 |
| 2009/0223279 | A1 | | 9/2009 | McFarland |

\* cited by examiner

*Primary Examiner* — Jason M Greene
*Assistant Examiner* — Dung H Bui
(74) *Attorney, Agent, or Firm* — K. Karel Lambert (57) ABSTRACT

An aerosol sampling intake configured to exclude particles generally greater than 20 microns AD and capture particles of less than about 10 microns AD with high efficiency, independent of weather conditions, through which air is sampled by suction. The intake combines an omnidirectional horizontal segment with diffuser and elbow, the elbow transitioning flow to a vertical segment, the vertical segment with overhanging lip, the centrifugal impactor for self-cleaning operation, thus relieving the dual problems of re-entrainment of particles bouncing from the impactor surface and fouling by particles sticking to the impactor surface. The device is adapted for use on moving vehicles, for sampling at increased windspeeds, or for sampling in rain.

9 Claims, 9 Drawing Sheets

AIR INTAKE

AIR EXHAUST

Fig. 3
*(PRIOR ART)*

AIR INTAKE

TO VACUUM

GENERAL METHOD FOR CENTRIFUGAL IMPACTION-ASSISTED ELUTRIATIVE CLASSIFICATION OF PARTICLES

Admit a slice of a moving airstream through an omnidirectional circumferential inlet slot and accelerate that airstream, which is now isolated from rain and wind and is internalized in the intake housing.

↓

Decelerate the airstream in a diffuser and bend the streamlines upward into a vertical passageway enclosed in the round by the bell-housing of the bonnet and on the other side by the aerodynamically sloped outside walls of the central pillar.

↓

Cause to be impacted any oversized particles and mist at or near the top of the impactor surface formed by the rising outside wall of the central pillar and bulbous annular lip crowning the central pillar, which encloses the descending common collection duct at the housing center axis.

↓

Convey informationally rich particle material entrained in the air streamlines over the top of the bulbous lip and through a turn of 180 degrees or more, where a flow guide is used to ensure the streamlines separate cleanly from the roof of the bell housing as they are directed down and into the common collection duct.

↓

Optionally, concentrate, collect or analyze the informationally rich particle fraction downstream from the intake manifold.

OMNIDIRECTIONAL AEROSOL SAMPLING INTAKE

CROSS-REFERENCE TO RELATED APPLICATIONS

This application claims the benefit of priority under 35 U.S.C. §119(e) from U.S. Provisional Patent Application No. 61/317,192 filed Mar. 24, 2010; said patent document being incorporated herein in entirety for all purposes by reference.

GOVERNMENT SUPPORT

This invention was made with government support under Grant N00178-07-C-3034 awarded by DOD. The US Government may have certain rights in the invention.

FIELD OF THE INVENTION

The present invention relates to a weather-resistant omni-directional intake for aerosol sampling and to devices and methods for classifying aerosols into informationally-rich and informationally-poor particle types.

BACKGROUND

Devices and methods for sampling and analysis of airborne particles (aerosols) from a moving airstream find use in environmental and industrial sciences and for surveillance. The most informative aerosol particles for the purposes contemplated here are those less than 20 microns in apparent aerodynamic diameter (AD), and particularly those particles of about or less than 10 microns AD, because these particles remain suspended in air for longer periods of time and more readily penetrate and lodge in the respiratory tract.

Aerosol sampling is made more difficult by wind, mist, dust and rain, and can be complicated when the aerosol sampling device is mounted on a mobile vehicle such as a truck, airplane, marine vessel or riverine vehicle. Design of a sampling inlet can also be problematic because of the accumulation of sand, salt crystals, dust, and fibers, and also water spray. Under heavy loading, particulate solids such as dust and fibers have been known to accrete so as to block the sampling inlet or reduce sampling efficiency and performance. Filter pads sometimes used for trapping aerosols also become blocked or tear when wetted by rain or mist.

Improvements are needed in the art to develop a sampling inlet that is resistant to weather and effectively samples the most informationally-rich particles from moving airstreams, i.e., those less than 20 microns AD. Because the direction of flow of the moving airstream can shift, an omnidirectional sampling inlet is needed. Such a device must be effective when mounted in a moving vehicle or stationary while subjected to increased surface winds, for example.

Ideally, the sampling inlet has a high efficiency in collecting particles less than 10 microns AD and a high efficiency in excluding particles greater than 20 microns AD under a range of ambient conditions, while not affected by changes in apparent windspeed or by rain. Advantageously, the device is also resistant to fouling by dust or fibers and is self-cleaning.

Figure 1A:
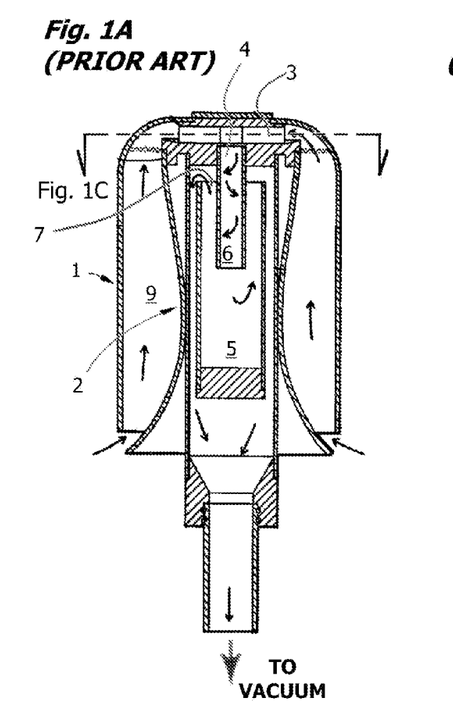
FIGS. 1A-B are cross-sectional drawings of a prior art sampler intake depicted in U.S. Pat. No. 4,461,183 to Wedding.
Figure 1B:
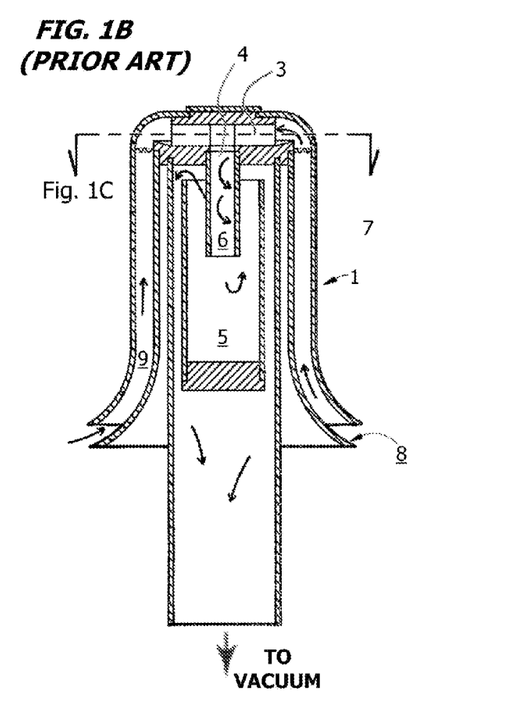
Figure 1C:
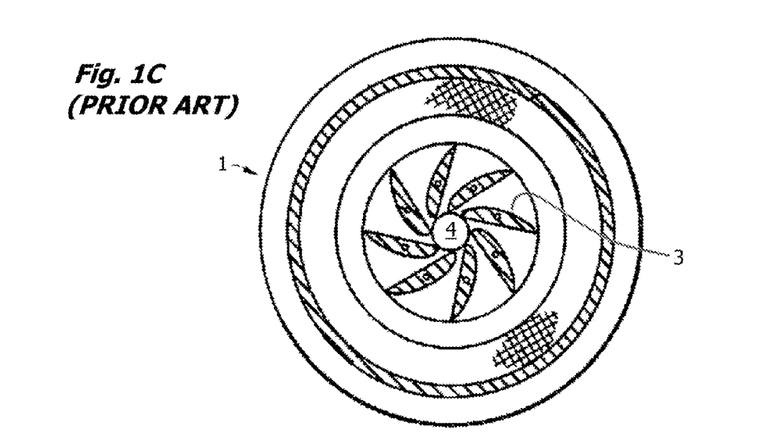
FIG. 1C is a sectional view of the head of the sampler.

Wedding, in U.S. Pat. No. 4,461,183, describes an omni-directional aerosol sampler with cylindrical external housing (1), internal skirted flow deflector (2), and cyclonic particle fractionators, ie. having airfoil-shaped vanes for forming a cyclonic flow in the downtube. As shown in FIG. 1, a flow of air through the device is pulled by a downstream vacuum and is made cyclonic by airfoil-shaped vanes (3) at the inlet (4) to the particle fractionator. The particle fractionator consists of a vertical, blind-bottomed, tubular trap (5) for receiving the downwardly directed vortex through a narrow downtube (6) mounted centrally under the vanes (3) and extending into the trap (5), such that air entering the trap must reverse course and rise to exit through an annular outlet (7) at the top of the fractionator. The device is configured so that half the particles greater than 10 microns impact the walls of the particle fractionator and are collected in the trap (5). The aerosol is thus classified into a coarse fraction, which is trapped in the device, and a fine fraction that exits the device and may be captured on a filter cassette. The airfoil-shaped vanes are described as a two-dimensional shape (Col 4, lines 42-47) that is effective in eliminating particle deposition or build up. A lower flared portion of the skirt (8) directs air upwardly into the vanes (3). The curvature and diameters of the intake duct (9) are selected so as to prevent turbulence or deposition of particles upstream from the vane assembly and trap (Col 5, lines 1-3). Thus particle removal occurs in and on the walls of the trap (5), which functions as a cyclonic impactor. This design is inherently not self-cleaning and cannot continue to function without period emptying of the trap. Condensate collecting in the trap cannot be drained without disassembly. It is thought that continued buildup of particles in the intake duct (9) will interfere with operation of the device. Relatively little consideration is given to the flow conditions around the bottom of the skirt so as to avoid external pressure ridges that would act to deflect and exclude sampling of smaller particles.

Cyclonic impactors are associated with increased inelastic impactor collisions unless used in conjunction with wetted wall devices and thus tend to take in an excess of larger particles that escape impaction by bouncing off the impactor surface.

The device also includes an internal bug screen. The device of FIG. 1B is reportedly scaled to draw 113 to 1133 liters/min (4 to 40 cfm) and to operate in windspeeds up to 24 kilometers per hour (15 miles/hr). At higher windspeeds, collection of particles in the desired size range may be impeded because of impaction in the intake manifold, which unfortunately functions as an inertial or bluff body impactor. Also, the trap is not readily cleaned and may clog or fill with condensate, fibers and dust during operation under adverse conditions.

Figure 2:
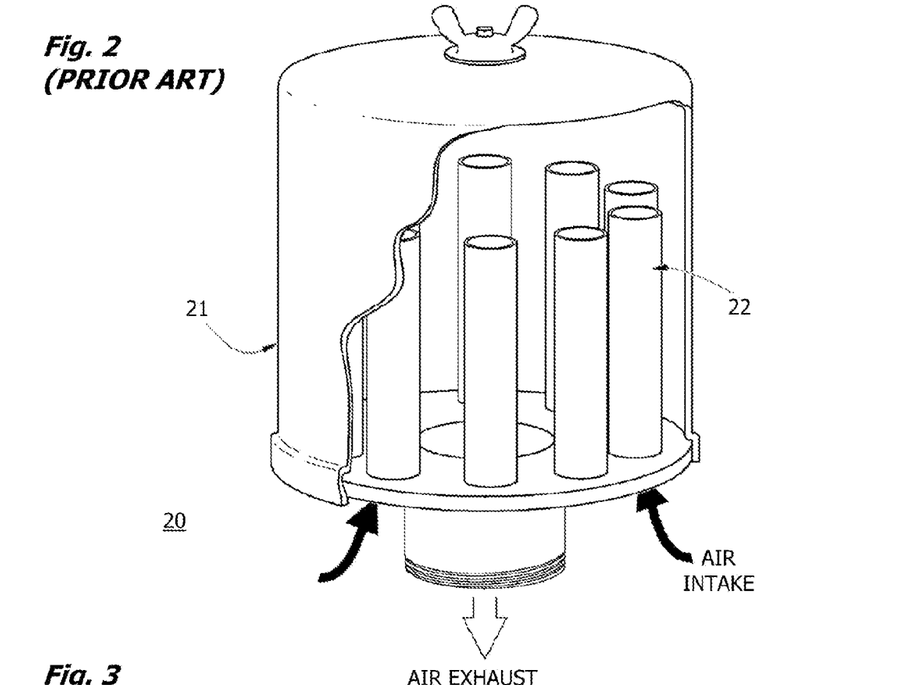
FIG. 2 is a cutaway view of a prior art sampler used with the Dry Filter Unit 2000.

Interestingly, the preferred system currently in use is not the Wedding device but rather the device (20) of FIG. 2, which is adapted from compressor intakes with noise-suppression, and is used by the US Department of Defense in their Dry Filter Unit 2000 particle capture technology. This unit is used in conjunction with a standardized duplex filter cassette which is removed periodically for immunoanalysis. Particles entering the updraft tubes (21) are classified by elutriation, and the particle depleted fraction is then directed to the vacuum exhaust. Elutriation is known to have a relatively poor particle size resolution capability and a broad cutsize limit. We have found that the units have relatively low efficiency in capture of informationally-rich particles with increasing wind speed. The unit is not self-cleaning and particles frequently accumulate in the housing (22) between the updraft tubes (21). Also, moisture that enters the filter cassette can lead to false negatives. The system would benefit from increased sensitivity, improved cutsize resolution, and better wind-resistance.

Figure 3:
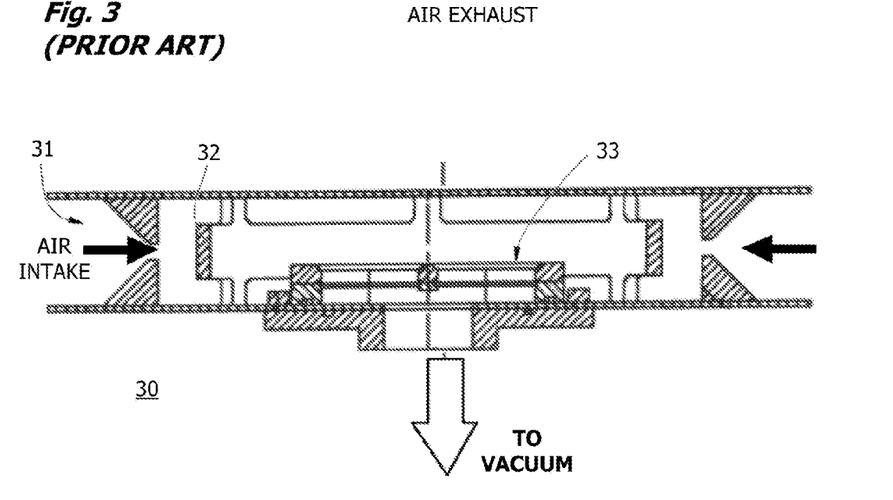
FIG. 3 is a cross-sectional view through a sampler intake developed by the University of Minnesota for the Department of the Navy.
Figure 4:
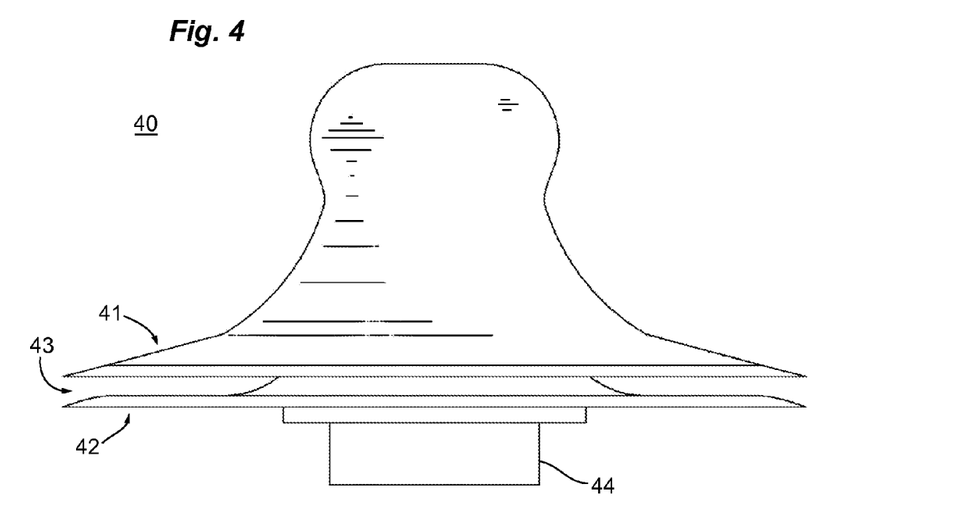
FIG. 4 depicts a first embodiment of an omnidirectional sampling intake of the invention, shown here in elevation view.
Figure 5:
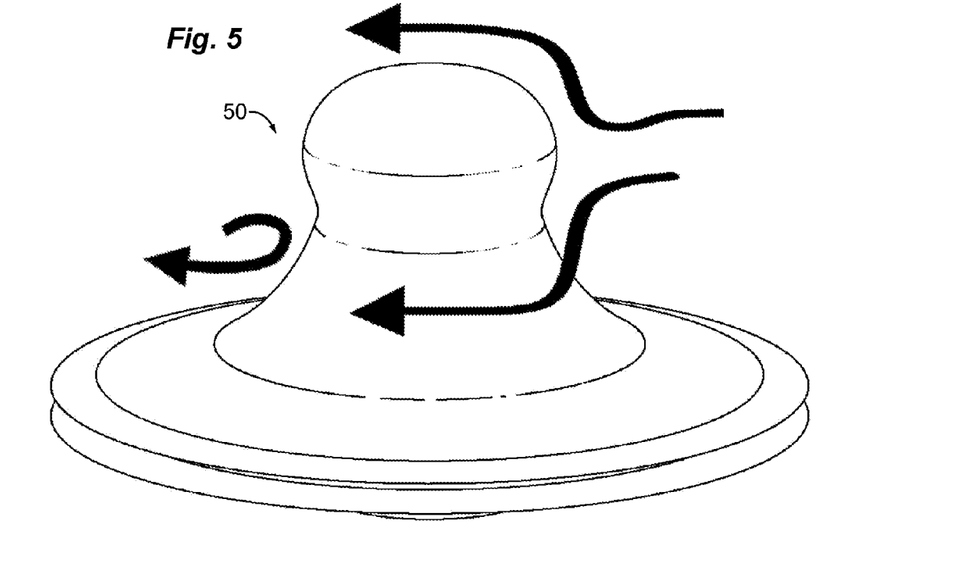
FIG. 5 depicts an omnidirectional intake of the invention in perspective view; showing wind moving across the aerodynamic sampling head.
Figure 6:
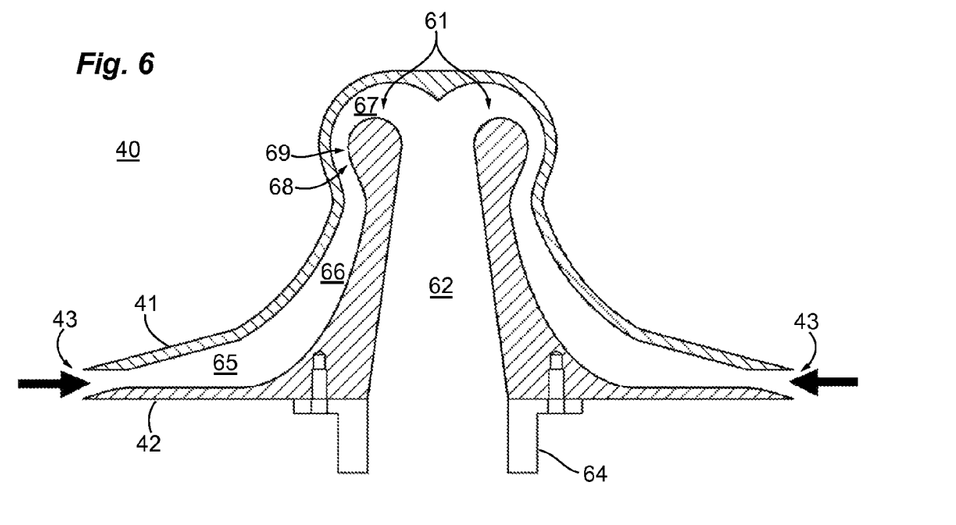
FIG. 6 shows an omnidirectional intake of the invention in cross-section.
Figure 7:
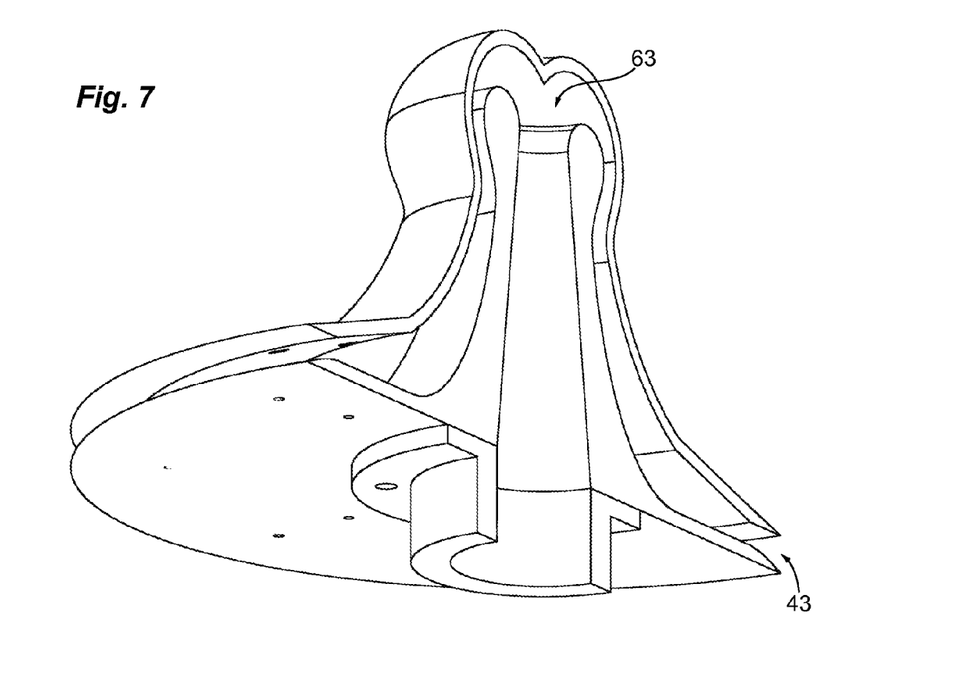
FIG. 7 is a perspective cutaway view of an omnidirectional intake of FIG. 6.
Figure 8:
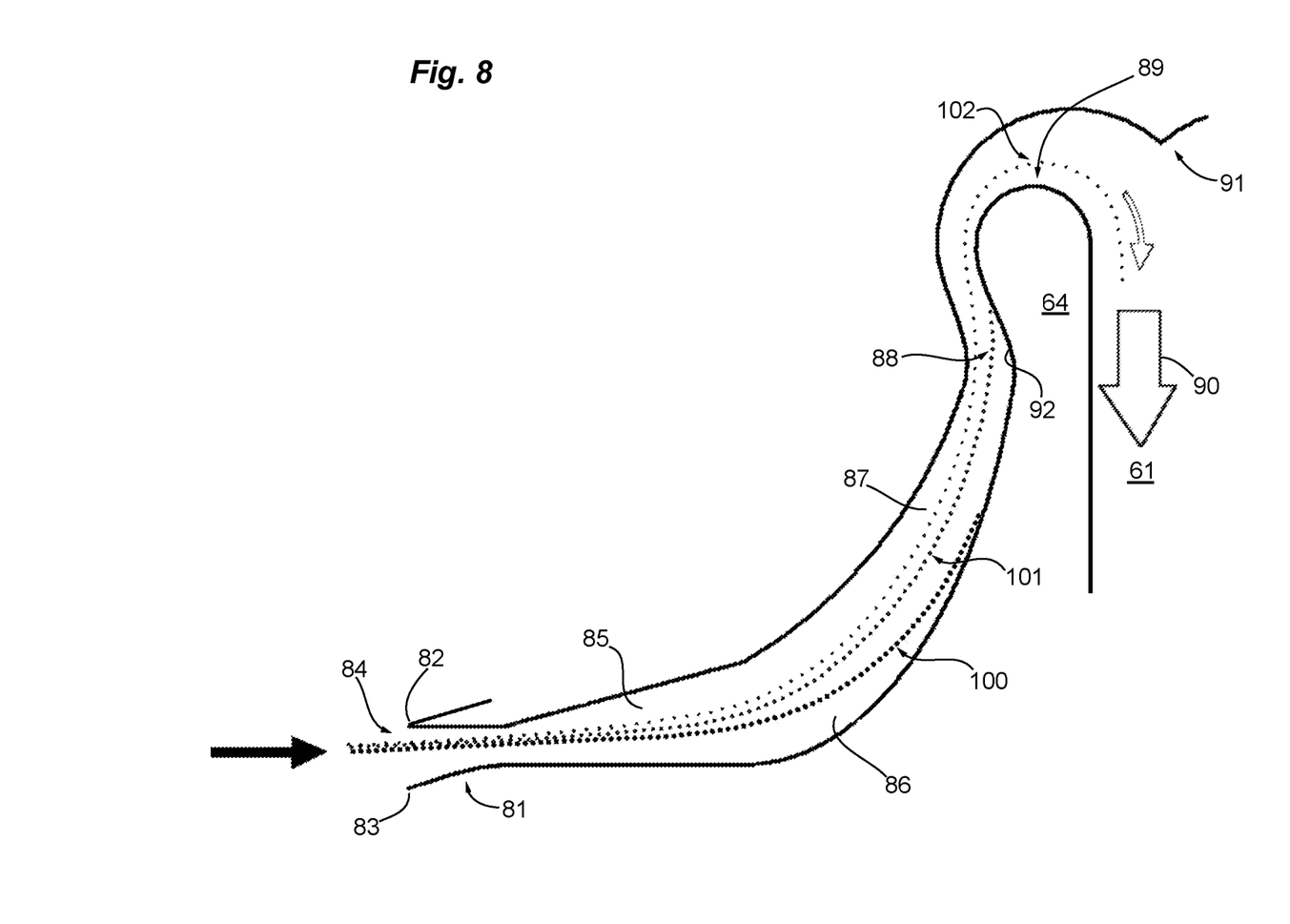
FIG. 8 describes the internal airways of an omnidirectional intake of the invention.

One improved system is shown in FIG. 3. This system uses an eductor (31) with inertial impactor (32) to separate coarse material from a bending flow stream that is then directed onto a duplex filter cassette (33). The duplex filter cassette is the same as the one used with the Dry Filter Unit 2000 developed by the Department of Defense. The inlet units (30) are designed to be stacked for storage and feature a hinged housing for easy access to the filter cassette. Unfortunately, this prior art device is relatively inefficient at classifying particles by size due to its geometry and the close proximity of the inertial impactor and sampling cassette, which may allow entry of raindrops and is associated with accumulation of condensation inside the ductwork due to lack of drainage. Also at issue is the higher pressure drop, power loss and potential for fouling because inlet flow is passed through a small constriction.

As is also known in the art, downstream virtual impactors, cascading virtual impactors, bluff-body impactors, liquid impingers, filters, and the like may be used to further concentrate, classify or capture aerosol species by size or composition. While these techniques are well known, the design of the initial sampling inlet remains problematic because of instabilities of the outside air mass relative to the intake and because of lack of streamlining of the outside housing of the intake. Also of concern, the inlet may not be self-purging of coarse particles and fibers, or of water vapor or rain.

In U.S. Pat. No. 6,530,287 to Rodgers, a rain shroud covers canted intake nozzles spaced around a central chamber; the intake nozzles are canted so as to drain moisture that enters under the shroud while admitting particles. This unit lacks capacity to fractionate particles by size and is generally non-specific in admitting large and small particles into the central chamber.

Accordingly there remains a need in the art for improved devices and methods for omnidirectional collection of aerosols that overcome the above disadvantages.

SUMMARY

Generically, the invention is an omnidirectional sampling intake for collecting informationally-rich particles from a moving air column and rejecting informationally-poor particles. The invention overcomes certain difficulties of the prior art in that it is a) effective in classifying and sorting informationally-rich and informationally-poor particles and is effective over a range of wind speeds and weather conditions, and b) is provided with self-cleaning features. The inventive intake takes advantage of a combination of centrifugal and gravitational forces on particles to achieve these effects and is thus an "elutriatively-assisted centrifugal impactor". Combined are a horizontal omnidirectional flow path, a first centrifugal impactor section or elbow that transitions aerodynamically to a vertical flow path, and an overhanging lip at the top, which forms a centrifugal impactor that is self-cleaning in operation. The horizontal segment is optionally a diffuser. Unlike devices of the prior art, the invention overcomes a notorious difficulty in excluding particles that "bounce" off an inertial impactor surface from re-entering the intake streamlines and undesirably being re-entrained in the airflow through the device.

Most larger particles are excluded by centrifugal inelastic impaction in the elbow from horizontal to vertical flow. Particles that experience elastic collisions on the impactor surface will reflect from the surface but most likely will remain in the flow boundary layer where air velocity is low. These re-entrained particles are further classified by elutriation in the vertical flow path segment of the inventive intake manifold. This combination of the precision of centrifugal impactor geometry with the re-entrainment resistance of an elutriative classifier has not previously been reported and is surprisingly effective in rejecting oversize, informationally-poor material. As a result, we are able to report our results on a linear particle diameter axis rather than a log particle diameter axis (compare FIGS. 9 and 10 herein versus FIG. 18 of US Patent Application 2009/0223279, for example) and achieve a $D_0$ of 20 microns over a range of windspeeds.

In the inventive device, larger particles that impact in the intake manifold either drop down and away from the intake or adhere to the impactor surfaces until removed by a cleaning action. Smaller particles (i.e., those which are most relevant to the biological and chemical monitoring applications of the intake manifold of the invention) are not impacted and are swept with the streamlines into a collector duct, where they may be quantitated, concentrated or collected for further analysis. Streamlines in the intake manifold are non-cyclonic, reducing losses of informationally-rich particles that are likely as the path length is extended.

Mist is an example of a relatively "information-poor particle". After acceleration in the intake inlet, fine mists are effectively trapped by centrifugal forces on the vertically disposed impactor surface, but would not be trapped by elutriation alone. Mist coalesces to form water droplets that are shed from the vertical impactor surfaces, thus cleaning the impactor of salts and solids. Airborne salt spray is another information-poor particle. Information rich particles include particles containing microorganisms, including bacteria, fungi and viruses, particles containing toxins, noxious or irritating particles, and particles containing chemical reactants, for example. Information rich particles are typically less than 20 microns in diameter, most frequently about or less than 10 microns in diameter, because these particles remain suspended in an air column and are likely to penetrate the respiratory system. The intake manifold is configured so that these particles of interest follow the air streamlines through the intake and may be concentrated, collected or analyzed downstream by a variety of techniques known in the art.

A variety of concentrative and analytical downstream devices may be used with the intake manifold of the present invention, including for example the aerodynamic lens and skimmer assemblies of U.S. Pat. Nos. 7,704,294 and 7,875,095, which are co-assigned.

Interestingly, at higher windspeeds, windstreams passes through the opening of the inlet slot, the horizontal flow path segment, and the first elbow section. Smaller particles are diverted into the collector duct under suction, but the wind acts to scour out rejected particles that were previously deposited within the intake manifold or captured on the impactor intake duct surfaces, another self-cleaning feature of the invention.

The inventive intake manifold is typically spar-mounted in use. The device is mounted on a mast so as to reduce surface ground effects such as intake of road dust when mounted on a moving vehicle. The shape of the housing bonnet is made aerodynamic to minimize formation of a pressure ridge on the windward edge of the sampling intake, which could divert smaller particles from the intake, and leeward eddies that could propagate into the internal flow channel. The circumferential leading edges of the intake are made knife sharp to cut streamlines that flow around and into the sampling inlet, which is a narrow slit that encircles the sampler. The bonnet is designed to shed rain and aerodynamically is configured for minimal drag and bow wave when exposed to wind. Happily, the more efficient internal design serendipitously results in a more aerodynamic housing design.

In a first embodiment, the invention is an omnidirectional wind and rain resistant intake for collecting a particle concentrate of informationally-rich particles, where the particle concentrate is impactingly and elutriatively depleted of informationally-poor particle fractions, including oversize material and rain droplets. The intake member is a housing made up of a rain bonnet plate and a baseplate. The two plates are spaced apart to form an internal manifold with flowpath therebetween and are separated by an intake slot all around the two plates. The internal manifold also has an outlet port generally on a center axis, a first inside surface formed by the bonnet plate and a second inside surface formed by the baseplate. The internal manifold functions to direct a suction airflow from the intake slot to the outlet port along a flowpath between the inside surfaces and to separate information-rich particles and information-poor particles, rejecting particles that are oversized such as sand, road grit, raindrops and so forth. The internal manifold thus functions as an elutriatively-assisted impactor and may include, in order of passageworks therethrough:

a) a horizontal flow section for ordering a suction airflow into horizontal streamlines and for elutriatively removing a first cut of the information poor particles from the suction airflow according to a first cut-off size;

b) a first centrifugal impactor section fluidly joining the horizontal flow section to the outlet port, the first centrifugal impactor section for impactingly removing a second cut of the information poor particles from the suction airflow according to a second cut-off size; where the first centrifugal impactor section is generally an elbow turn transitioning the horizontal section to a vertical updraft section of the flowpath;

d) a contoured overhanging lip forming an elutriative centrifugal impactor, where the overhanging lip is positioned around the top of a central pillar;

e) a narrow rounded passage between the uppermost crown of the central pillar and an apposing inside surface of the bonnet plate;

f) optionally a flow guide for smoothly bending the direction of flow downward, and g) a descending collector duct or downslip tube on the center axis that may be fluidly connected to a downstream suction pump or blower.

In one aspect of the invention, the inlet slot between the plate edges comprises upper and lower inlet lips, the upper lip formed on the bonnet plate and the lower lip formed on the baseplate, the upper lip having an upper lip inside surface and a the lower lip having a lower lip inside surface, and wherein the upper inside lip surface is generally horizontal to a ground plane and the lower inside lip surface is angled up along the flow path at a generally planar angle or flare of less than 45 degrees, more preferably 5-30 degrees, thereby forming a converging annular entrance to the flow path to compensate for any ground boundary layer effect and any deflection of excluded windstreams around or over the bonnet plate.

The horizontal flow section is optionally a diffuser section, having a generally diverging inside upper surface and second lower surface with increasing distance from the intake slot, the diffuser flow for slowing streamline velocities and for sharpening the first cut-off size.

The elbow segment of the flowpath functions for bending and accelerating the horizontal streamlines as generally vertically-directed streamlines, transitioning the flow path to an elutriatively-assisted impactor section. The elutriatively-assisted impactor section comprises upwardly converging inside surfaces, a first inside surface forming a generally bell-shaped female surface and a second inside surface forming a generally pillar-shaped male surface with crown. The pillar-shaped male surface matingly conforms to the female surface with space for the flowpath annularly converging between. The crown of the pillar is surrounded by a radiused annular lip or collar projecting into the flowpath, the projecting radiused annular lip with underside impactor surface for impactingly capturing the information-poor particles with elutriative assist, thereby excluding the informationally poor particles from the suction airflow and conveying the informationally rich particles over the radiused annular lip. We believe that an elutriatively-assisted centrifugal impactor with self cleaning features is an advance in the art.

Uses of the present invention include detection of biological or chemical warfare agents in the form of aerosols, collection of industrial pollutant particles such as fly ash in a gas plume, sampling of air in buildings associated with "sick building" syndrome, collection of infectious or disease causing organisms in hospitals and public spaces, the collection of radioactive particles, and collection of biological aerosols such as endotoxins, indoor and outdoor allergens, monitoring of industrial pollution, and so forth. It is also contemplated that the present invention may be used for the detection and collection of airborne particles associated with illegal drugs and explosives, or their precursors.

BRIEF DESCRIPTION OF THE DRAWINGS

The teachings of the present invention can be more readily understood by considering the following detailed description in conjunction with the accompanying drawings, in which.

NOTATION AND NOMENCLATURE

Certain terms throughout the following description and claims are used to refer to particular features, steps or components. As one skilled in the art will appreciate, different persons may refer to the same feature, step or component by different names. This document does not intend to distinguish between components, steps or features that differ in name but not in function or action. The drawing figures are not necessarily to scale. Certain features or components herein may be shown in somewhat schematic form and some details of conventional elements may not be shown in the interest of clarity and conciseness.

Certain meanings are defined here as intended by the inventors, ie. they are intrinsic meanings Other words and phrases used here take their meaning as consistent with usage as would be apparent to one skilled in the relevant arts.

"Aerodynamic diameter" (AD) is the diameter of a virtual sphere of unit density (1 g/cm$^3$) that attains the same terminal settling velocity ($v_s$) at a low Reynolds number as the actual physical particle under consideration. For mathematical modeling purposes, it is convenient to express the behavior of an irregularly shaped particulate specimen as if it were a spherical particle, making it easier to predict, compare and correlate various materials. Typically, the density of a particulate sample is not known during field sampling and calculations are generally performed assuming unit particle density (1.0 g/cm$^3$).

"Cut-off size" ($D_{50}$)—is defined as a particle size, generally as aerodynamic diameter, for which 50% of the particles of that size are separated from an airflow under specified conditions of operation.

$D_0$ refers to a cut-off size taken as essentially 100% exclusion, which indicates that a particle exceeding a critical diameter $D_0$ is excluded from an airflow.

"Informationally-rich particle"—refers generally to a particle having an aerodynamic diameter of less than 20 microns, and particularly to a particle having an aerodynamic diameter of less than or about 10 microns. In contrast, informationally-poor particles are generally those greater than 20 microns in diameter, and include dust, mist, fog, and raindrops, which have little or no significance in the applications described here. Informationally-poor particles are generally "oversized" particles, exceeding a cut-off size for rejection by the intake.

"Anisokinetic" sampling is a condition in which the mean velocity of the ambient airstream differs from the mean velocity of the air entering the intake manifold.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, particular features, structures, or characteristics of the invention may be combined in any suitable manner in one or more embodiments.

"Conventional"—refers to a term or method designating that which is known and commonly understood in the technology to which this invention relates.

Unless the context requires otherwise, throughout the specification and claims which follow, the word "comprise" and variations thereof, such as, "comprises" and "comprising" are to be construed in an open, inclusive sense: that is, as "including, but not limited to".

DETAILED DESCRIPTION

Although the following detailed description contains many specific details for the purposes of illustration, one of skill in the art will appreciate that many variations and alterations to the following details are within the scope of the invention. Accordingly, the exemplary embodiments of the invention described below are set forth without any loss of generality to, and without imposing limitations upon, the claimed invention.

Intake (or "inlet") efficiency is a function of aspiration efficiency and transmission efficiency. Overall efficiency is also determined by the downstream capture or collection efficiency, which is generally very high, but is determined by a capture device such as filter membrane or liquid impinger which is generally downstream from the intake manifold per se.

$$\eta_{overall}=\eta_{aspiration}+\eta_{transmission}+\eta_{capture}$$

Since downstream capture efficiency, such as by filtration, is generally very high, the upstream cutoff and exclusion limits of the intake manifold to a great extent determine whether performance of overall airborne particle capture and analysis is satisfactory for the application. Thus significant attention to efficient admission of informationally-rich particles and efficient exclusion of informationally-poor particles are both relevant to intake manifold performance.

In the design of the present invention, a novel combination of elutriative classification and centrifugal impaction is used to separate the incoming particles into two fractions. A $D_0$ of about 20 microns AD was readily achieved with this combination, which ensures that particles which "bounce" off the virtual impactor are elutriated by gravitational settling rather then re-entrained in the upwardly directed streamlines being drawn over the lip at the crown of the impactor surface. A $D_{50}$ of about 10 microns AD is readily achieved over a range of windspeeds. In testing at windspeeds of less than 10 mph, essentially all particles of 10 microns or less are conveyed to the collector duct, in agreement with calculations. All surfaces are designed and contoured aerodynamically by computational fluid dynamics to achieve this performance.

Turning now to the figures, FIGS. 1 through 3 are views of devices representative of the technical skill in the art and were discussed earlier as background. These figures are included for reference.

FIG. 4 depicts a first embodiment of an omnidirectional intake 40 of the invention, shown here in elevation view. The device is seen to consist of a two-part housing with generally "bell shaped" rain bonnet plate 41 having sloping walls and, nested thereunder, a baseplate 42 under the hollow, tented bonnet. Between the bonnet plate and the baseplate is an internal manifold for classifying particles by aerodynamic size (AD). The internal manifold contains passageworks that originate from a circumferential inlet slot 43 visible at the outside edges of the housing and which separates the bonnet and the baseplate. The inlet slot is omnidirectional so that airflow containing aerosols may enter from any direction. Also visible is a cylindrical adaptor or mounting ring 44 useful for attaching the sampling intake to a mast, or spar. The mounting ring is a hollow pipe and may be attached to a suction source necessary for driving the particle collector.

Air that enters the inlet slot 43 is pulled through the internal passageworks of the sampling manifold at a velocity determined by the capacity of the suction source and the internal dimensions. The path taken by the airflow is termed the "flowpath". In one embodiment, the vacuum source is a ½ horsepower blower which operates at a nominal draw of 750 sLpm. In other embodiments, draws of 1000 sLpm or more are conceived.

FIG. 5 depicts an omnidirectional intake of the invention in perspective view; showing windstreams (arrows) and eddies moving across the aerodynamically-shaped bonnet. The aerodynamics of the housing are significant in several respects. First, the leading circumferential edge is isolated from the central mass of the bell housing so that streamlines approaching the device are readily separated between those entering the inlet slit and those crossing outside the housing. Some streamlines that enter the internal passageways on the windward side of the device exit the device on the leeward side without capture. As external windspeed increases, an angle of attack develops that is progressively more acute, and at high windspeed, the column of air conveyed to the internal works is largely drawn from the part of the inlet slot directly facing into the wind because air entering between the bonnet and the baseplate in excess of the suction capacity can exit the opposite side. As wind direction shifts, the sampler is unaffected, always drawing air from the source direction of the wind, but at more moderate windspeeds, the sampler becomes less selective and draws air from all directions.

Happily, the aerodynamic external contours 50 of the housing result from the form given to the internal manifold. This internal structure is detailed in the following figures. FIG. 6 shows a cross-section of the omnidirectional intake. The dark arrows indicate the position of streamlines that enter the inlet slit 43. The bell-shaped bonnet 41 forms a cover over the internal manifold and the baseplate 42 supports a central column or pillar 61 that contains the central common duct 62 which is coaxial with the mounting ring 44. Both the bonnet and baseplate are mounted on a common central axis. The passageways of the intake manifold are provided with aerodynamically contoured internal structure that will be explained below.

Surfaces of the internal manifold are contoured to direct the air streamlines entering the inlet slit through a generally horizontal vestibule 65, into a vertical updraft section 66, and then around a topmost curve 67 that is generally greater than 180 degrees of turning. This bend is the result of the bulbous overhang 68 that forms the top of the vertical updraft section and connects the intake to the descending collector duct 62. The lower outermost lip 69 of the bulbous overhang forms a centrifugal impactor surface. By mounting the centrifugal impactor surface in a vertical updraft, oversize particles that bounce or fall from the impactor will drop or settle to the bottom of the central pillar and can be swept from the base of the pillar and the vestibule by crosswinds. Rain or dew that enters the inlet slot but is excluded from the collector duct also can serve to wash the external pillar surfaces and vestibule free of any particle deposits, a self-cleaning feature.

FIG. 7 is a perspective CAD view of a half-section through the omnidirectional intake housing and is shown for clarity in visualizing the internal passageworks 63 and circumferential inlet slit 43.

FIG. 8 describes the internal airways and passageworks of a preferred embodiment in more detail. The tracks of three particles entering the inlet slot are shown, as if by time lapse photography. The three particles differ by increasing aerodynamic size and can be characterized as small, medium and large particles for purposes of illustration.

As shown in cross-section, all particles enter the inlet slot and are accelerated in a convergent section 81 of the channel formed by sharp leading edges 82,83 of the bonnet 41 and baseplate 42. In this simplified view, the largest particle (lower track 100) is seen to move from the inlet slot 84, through the converging section 81 formed by inside surfaces of the lips, and into a horizontal section with diffuser 85, also termed a "vestibule". Small (102) and medium particles (101) follow a similar track at first, but the tracks begin to diverge in the diffuser 85. As streamline velocity slows, the flow begins to slope upward in a vertical turn or elbow 86 and then converge again as a vertical updraft 87. The elbow is a centrifugal impactor and some particle tracks will impact the inside wall in the elbow as shown (100). As the flow is bent to 90 degrees from horizontal and then past 90 degrees when passing over a overhanging turn 88 near the top of the passageway, speed is accelerated. At the crown 89 of the central pillar the passageworks again narrow so that smaller particles (small dots, 102') remain entrained in the streamlines during a complete rotation of direction from up to down. The streamlines and any particle concentrate enters the descending collector duct (arrow, 90), drawn by suction pressure. A flow guide 91 is used at the top center to direct these particles downward into the central common duct and is contoured to reduce turbulence at the point of flow separation.

In contrast, large and medium sized particles impact the external wall or aspect 92 of the central pillar. In an elastic collision, the particle sticks to the impactor surface until dislodged or cleaned. In an inelastic collision, the particle bounces from the surface back into the airflow, but its velocity is reduced and it settles in response to gravity, falling back along the passageway and coming to rest near the bottom of the central pillar, where it can be washed or blown out of the intake manifold, or otherwise cleaned away. The device thus serves as an elutriatively-assisted centrifugal impactor for classifying particles and concentrating particles of interest, rejecting those particles that are informationally poor.

The net result is that the column of air drawn through the intake manifold is depleted of "oversize" (i.e., greater than about 20 micrometers in apparent aerodynamic diameter, for example, including bits of sand, raindrops, and more dense and inert materials) particles, which are rejected by the combined actions of elutriation and centrifugal impaction. In contrast, particles in the informationally-rich class (including biological cells, dispersive powders such as chemical or biowarfare agents, and very fine vapor droplets) are received into a common central duct, where they can be assessed in flight, further concentrated, or can be conveyed to an analytical device. Thus the sectional view shown schematically illustrates how the device works as a particle concentrator and classifier. By configuring the internal manifold flowpath with critical dimensions for a desired range of airflows, the effective particle size exclusion and transmission limits can be closely controlled.

As seen in the figure, the small particle track (102) exits the upflow section of the geometry without impaction on the wall. Improved performance results from the presence of an anisokinetic diffuser section (85) that reduces the particle velocity at the elbow turn. Inertial effects are used to advantage to slow and direct particles above a cut size for the device into the outside wall of the central pillar.

In a first preferred embodiment, designed for an airflow of 750-1250 sLpm, an inlet slot of 0.75 cm was found to be highly effective in conveying particles of 10 microns (or smaller, depending on velocity and operating conditions) through a bending passageway having a minimal critical dimension of 0.5 cm with essentially no losses. In a second preferred embodiment, the device is scaled for an airflow of about 10 sLpm and is designed to achieve efficient capture at Stokes numbers and higher linear velocities of flow. Smaller or larger flows are also accommodated.

The flow guide 91 is particularly useful in organizing the streamlines without separation eddies or effects as they enter to collector duct from all sides (i.e., omnidirectionally). While the view shown here is a two-dimensional drawing, in actuality, the flowpath extends fully in the round and the vertical central pillar is essentially a frustrum of a cone that has been reshaped to optimize its aerodynamic properties in excluding particles exceeding the desired size. Organized streamlines are more suited for forming a downstream particle beam, such as would be useful in concentrating the informationally-rich particle fraction in an aerodynamic lens and skimmer or other particle concentrator such as are known in the art. Of utility are the aerodynamic lenses and skimmers of U.S. Pat. Nos. 7,875,09 and 7,704,294, which are co-assigned.

The generally broadly umbonate shape of the central pillar 61 is crowned by an annular protuberance 68, 69 that resembles a bulbous lip or collar, which surrounds the central descending passageway forming the collector duct 62. The male curvature of this bulbous lip is closely mated to the internal female surfaces of the housing bonnet, which together form the narrow, convergingly turning passageway therebetween. Smaller particles are swept through a turn that is greater than 180 degrees in the narrow turning passageway before being carried down into the center of the device for further downstream processing.

Figure 9:
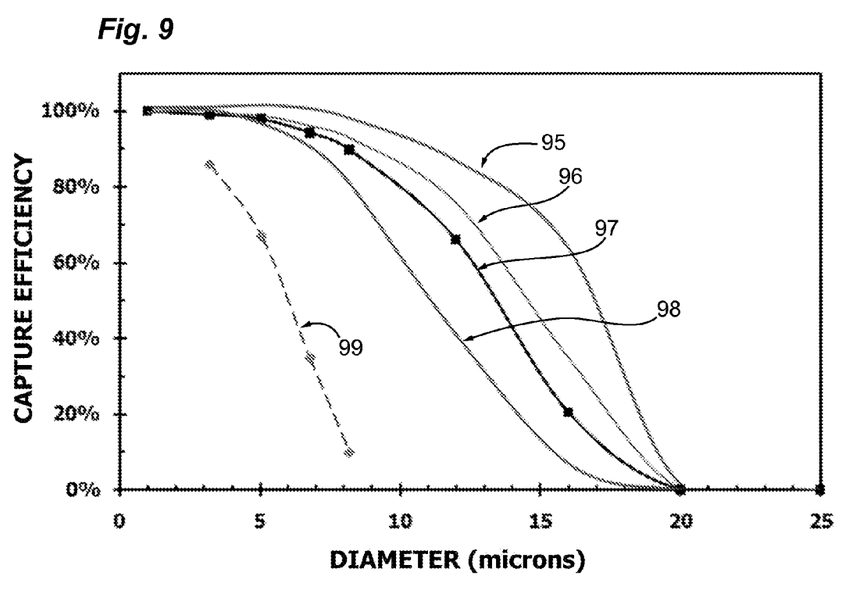
FIG. 9 is a modeling performance for particle classification and capture efficiency, inset with a comparison to the standard inlet of FIG. 2.

FIG. 9 is a plot of modeling work done to show performance for particle classification and capture efficiency, inset with a comparison to the standard inlet of FIG. 2. For solid curves are shown, each corresponding to capture efficiency particles as a function of particle size as windspeed is increased from 1 mph to 30 mph. Overall efficiency approaches 100% for 10 micron particles at windspeeds up to 20 mph and drops to about 65% at 30 mph. Nonetheless the $D_{50}$ at 30 mph is still greater than about 11 microns. In all cases, particle exclusion is essentially complete at greater than 20 microns AD. Shown are curves for windspeeds of 4.3 mph (95), 10.8 mph (96), 20 mph (97), and 30 mph (98). Performance of the standard inlet (FIG. 2) at 4.3 mph is shown as a dotted line (99). In comparison, particle capture efficiency as a function of size drops essentially to zero at a cut size $D_0$ of about 6 microns, too small for capture of the most informationally-rich particles.

Figure 10:
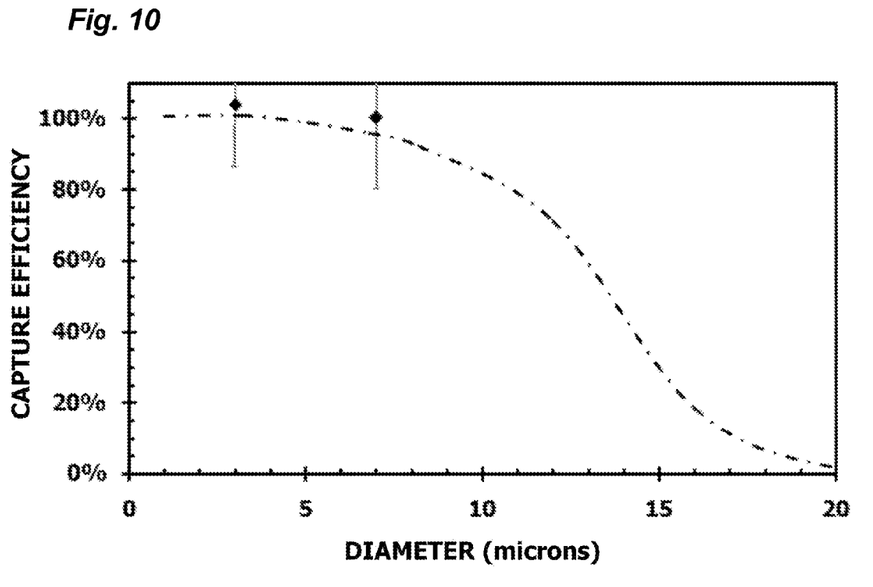
FIG. 10 is a plot showing measured performance versus modeled performance for particles of 3 and 7 microns AD at a windspeed of 10 mph.

FIG. 10 is a plot showing measured performance versus modeled performance for particles of 3 and 7 microns AD at a windspeed of 10 mph. Computational modeling is used to predict performance and is shown by the dotted line. Experimental results for the two particle sizes are shown by solid diamonds and exceed computational predictions.

Figure 11:
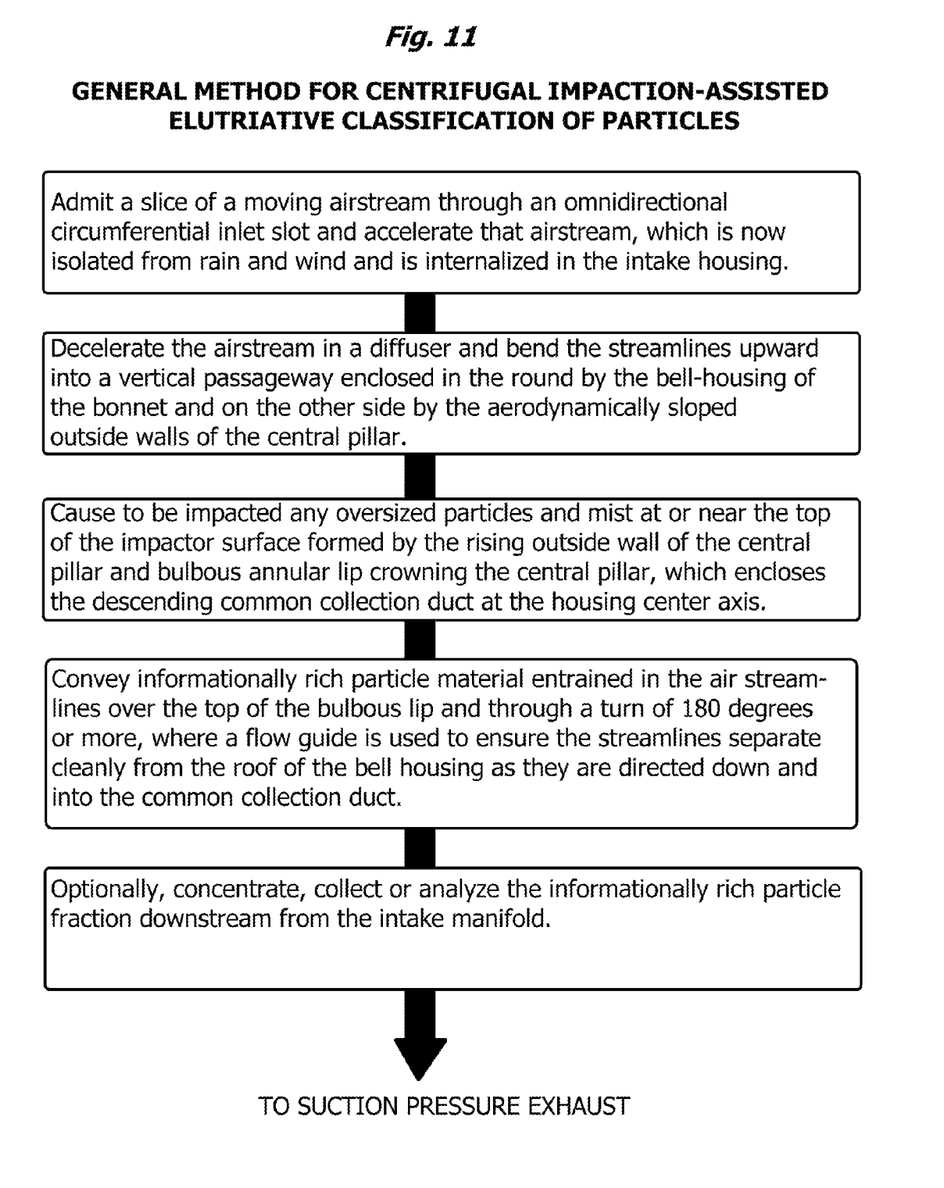
FIG. 11 describes a general rationale and methodology for use of an omnidirectional intake of the invention in an aerosol sampling protocol.

FIG. 11 describes a general rationale and methodology for use of an omnidirectional intake of the invention in an aerosol sampling protocol.

Particles existing in a moving air column are assumed to be randomly dispersed and a first function of a sampling manifold is to cleanly isolate a subset of the streamlines destined to enter the manifold housing from those that will pass around, over or under the housing assembly. Not all streamlines entering the housing are captured in the collector duct. As windspeed increases, the attack angle of the intake is restricted to high velocity streamlines originating to the direction from which the wind is blowing. These are slowed in the diffuser section of the manifold and may then curve up and into the collector duct or be shed out the leeward side of the housing. As before, particles riding those streamlines, regardless of direction of origin, are classified according to size. Larger particles are selectively impacted and elutriated in the vertical updraft segment of the manifold. Those particles that strike the external surfaces of the central pillar or bulbous lip are either lodged there and excluded from the airstream or bounce and settle away from the intake. Smaller particles are carried by the streamlines around the hemi-torus of the central pillar and are not subjected to cyclonic flow in the downslip tubing, thus minimizing losses on the inside surfaces of the collector duct. Subsequently, this particle fraction, which contains the more informationally-rich particles in the aerosol population (i.e., those having an aerodynamic size of less than 20 microns AD), can be concentrated, collected or analyzed.

Schematically the steps for centrifugal impaction-assisted elutriative classification are as follows:

1. Admit a slice of a moving airstream through an omnidirectional circumferential inlet slot and accelerate that airstream, which is now isolated from rain and wind and is internalized in the intake housing.
2. Decelerate the airstream in a diffuser and bend the streamlines upward into a vertical passageway enclosed in the round on one side by the bell-housing of the bonnet and on the other side by the aerodynamically sloped outside walls of the central pillar.
3. Impact oversized particle material and mist at or near the top of the impactor surface formed by the rising outside wall of the central pillar and bulbous annular lip or collar crowning the central pillar and surrounding the descending collector duct, which is located at the center axis of the housing.
4. Convey informationally-rich particle material with the streamlines over the top of the bulbous lip and through a turn of 180 degrees or more, where a flow guide is used to ensure the streamlines separate cleanly from the roof of the bell housing as they are directed down and into the collector duct.
5. Optionally, concentrate, collect or analyze the informationally-rich particle fraction downstream from the intake manifold.

This method is driven by a downstream suction pressure exhaust and is controlled by the configuration of the inlet slot and internal passageworks within the intake housing.

Optionally, the intake housing can be connected by a pipe or channel to a collection, concentration, or analysis module. In one embodiment, the collection module is a pair of filter membranes mounted side-by-side in a cassette that can be removed for analysis.

In other embodiments, the collector duct may comprise an annular aerodynamic lens having multiple lens elements for forming a "particle beam", and a skimmer for separating particle-depleted sheath flow from the particle rich "core flow" or particle beam, sometimes termed a "minor flow".

Figure 12A:
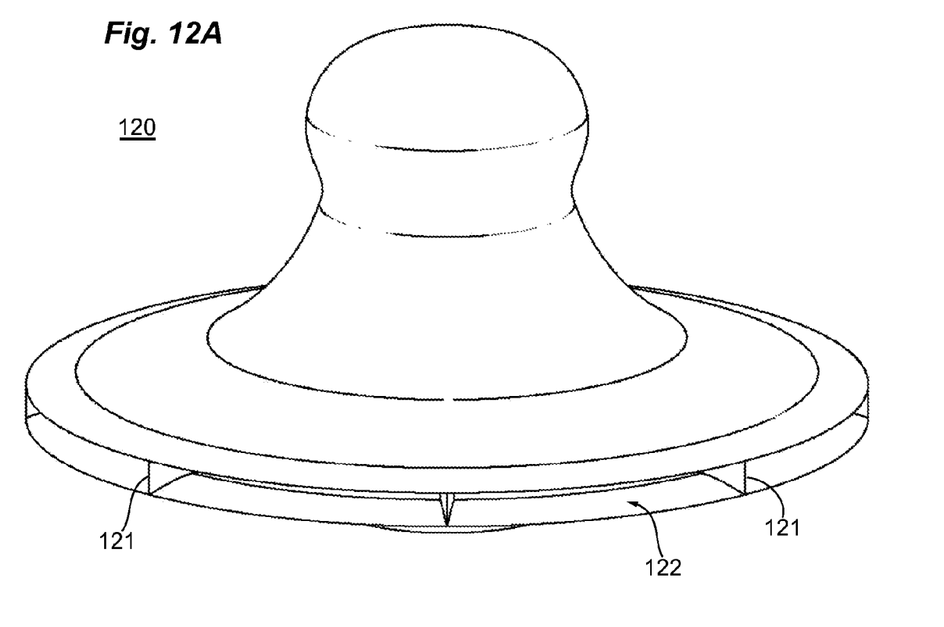
FIG. 12A is a second embodiment of an omnidirectional sampling intake of the invention.

FIG. 12A is a second embodiment 120 of an omnidirectional intake of the invention. In this embodiment, the internal passageways of the intake manifold are subdivided by radially directed wedges, the purpose of which is to direct flow under windy conditions into the collector duct without "cross-flow" losses out the back of the intake manifold. A large fraction of the particles that enter the radial inlet section some distance from the centerline pass between the plates and out the back of the inlet without entering the upflow section of the inlet. The use of vanes 121 in the inlet slit 122 and horizontal diffuser section is found to redirect more of these particles into the updraft section of the intake manifold, as is useful for some applications.

Figure 12B:
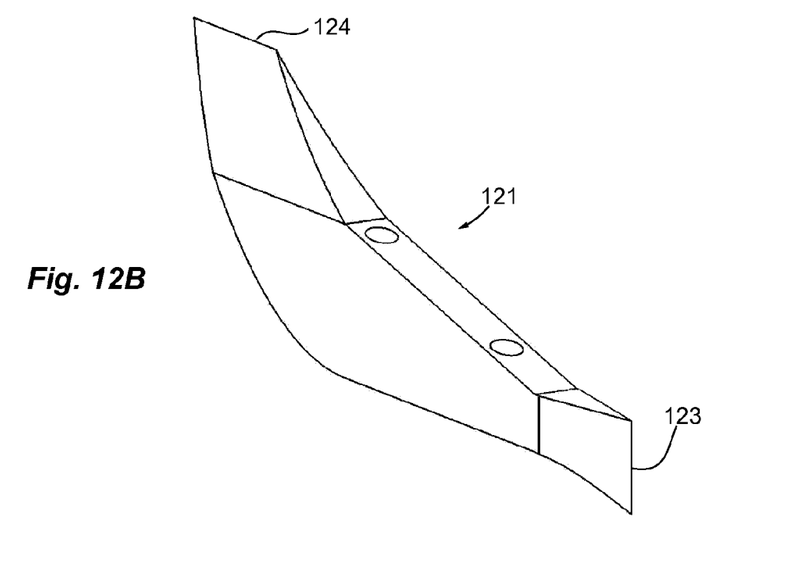
FIG. 12B shows a detail of the vanes used in the omnidirectional intake of FIG. 12A.

FIG. 12B shows a detail of one of the vanes used in the omnidirectional intake of FIG. 12A. This vane is not configured to induce cyclonic flow but rather to limit streamlines flowing between the bonnet and baseplate without interacting with the central column and impactor surfaces. Marked are the leading edge 123 and the trailing edge of the vane.

Figure 13:
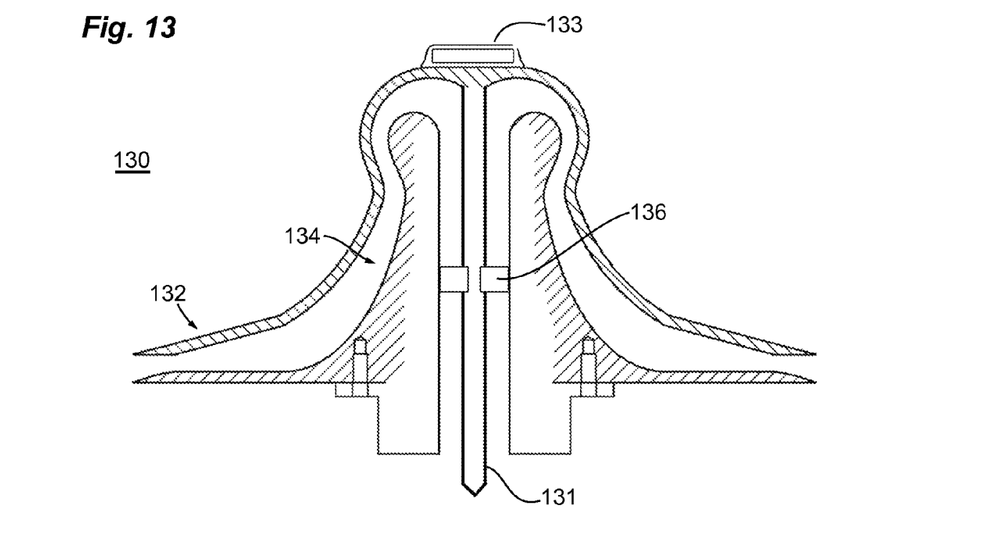
FIG. 13 describes a third embodiment of the invention with internal support rod for removable bonnet.

FIG. 13 describes a third embodiment 130 of the invention with internal support rod 131 for reversibly mounting a removable bonnet plate 132. The bonnet plate is supplied with a handle 133 and is mounted so as to slide up and out of the housing assembly. This exposes the central pillar 134 for cleaning if required, and the axial support shaft 131 can be fitted with cassette holders 136 for emplacing one or more filter membranes in the collector duct airway. Periodically the filter membranes may be removed for off-site testing. Various methods for automated monitoring of the filter membranes are also conceived. Other particle traps may be emplaced in the collector duct and are accessible after the bonnet is removed.

Figure 14:
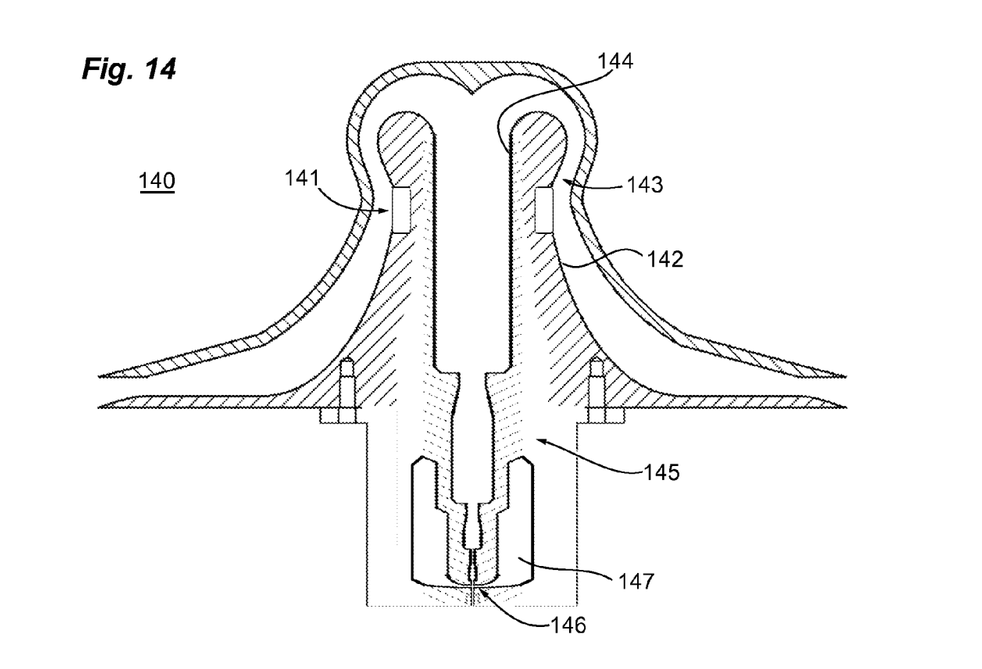
FIG. 14 describes a collar assembly for the baseplate, the collar having a tubular ultrasonic transducer for assisted cleaning.

FIG. 14 describes a collar assembly 141 for the central pillar 142, the collar having a tubular ultrasonic transducer for assisted cleaning. As shown, the collar is a ring transducer of a piezoelectric sandwich construction and when activated by an alternating current, expands and contracts so as to shake the impactor zones 143 and dislodge accumulated particles. This can be done periodically to clean the device before further use.

Also shown in FIG. 14 is a modified collector duct 144 with air-to-air particle concentrator disposed therein. The duct is configured with a cylindrical aerodynamic lens array 145 and skimmer 146 for forming a particle beam and for shearing off the sheath flow which is exhausted through the skimmer "chimney" passages 147 in the base of the housing. In this way, a dilute suspension of suspicious particles can be concentrated ten, twenty fold or more, simplifying analysis and increasing the sensitivity of the analysis to detect suspicious particles, which can be captured downstream and flagged for further screening if desired.

In a typical application, the inventive omnidirectional intake 140 with internal skimmer is intended to selectively collect informationally-rich particles on a one or more of filter membranes housed internally in a replaceable cassette downstream from the skimmer. Following collection of a sample, the cassette is removed for analysis. Other options are within ordinary skill in the art and are not compiled here.

While the above is a complete description of the preferred embodiments of the present invention, various alternatives, modifications and equivalents are possible. These embodiments, alternatives, modifications and equivalents may be combined to provide further embodiments of the present invention. Therefore, in the following claims, the terms used should not be construed or constructed to limit the claims to the specific embodiments disclosed in the specification, but should be construed and constructed to encompass and include all possible embodiments to which such claims are entitled. Accordingly, the claims are not limited by the specifics of the disclosure.

INCORPORATION BY REFERENCE

All of the U.S. patents, U.S. patent application publications, U.S. patent applications, foreign patents, foreign patent applications and non-patent publications referred to in this specification and/or cited in accompanying submissions, are incorporated herein by reference, in their entirety. When cited works are incorporated by reference, any meaning or definition of a word in the reference that conflicts with or narrows the meaning as used here shall be considered idiosyncratic to said reference and shall not supersede the meaning of the word as used in the disclosure herein.

We claim:

1. An omnidirectional wind- and rain-resistant sampling intake for collecting an information-rich airborne particle fraction, which comprises a bonnet plate and a baseplate, wherein the two plates are spaced apart to form an internal manifold with flowpath therebetween and are separated by an inlet slot all around, said internal manifold having an outlet port on a center axis, a first inside surface formed by said bonnet plate and a second inside surface formed by said baseplate, said internal manifold for directing a suction airflow from said inlet slot to said outlet port along said flowpath between said inside surfaces and for separating information-rich particles and information-poor particles therein, wherein said internal manifold comprises:

a) a horizontal flow section for ordering said airflow into horizontal streamlines and for elutriatively removing a first cut of said information poor particles from said suction airflow;

b) a first centrifugal impactor section fluidly joining said horizontal flow section to said outlet port, said first centrifugal impactor section for impactingly removing a second cut of said information poor particles from said suction airflow.

2. The omnidirectional sampling intake of claim 1, wherein said inlet slot comprises upper and lower inlet lips, said upper lip formed on said bonnet plate and said lower lip formed on said baseplate, said upper lip having an upper lip inside surface and a said lower lip having a lower lip inside surface, and wherein said upper inside lip surface is generally horizontal to a ground plane and said lower inside lip surface is angled up along said flow path at a generally planar angle of less than 45 degrees, thereby forming a converging annular entrance to said flow path to compensate for any ground boundary layer effect and any deflection of excluded windstreams around or over said bonnet plate.

3. The omnidirectional sampling intake of claim 1, wherein said horizontal flow section is a diffuser section, having generally diverging first inside surface and second inside surface with increasing distance from said inlet slot, said diffuser flow for slowing streamline velocity and sharpening said first cut.

4. The omnidirectional sampling intake of claim 1, wherein said first centrifugal impactor section comprises an elbow section of said flowpath for bending and accelerating said horizontal streamlines as generally vertically-directed streamlines, and said elbow segment fluidly transitioning said flow path to an elutriatively-assisted impactor section, wherein said elutriatively-assisted impactor section comprises upwardly converging inside surfaces, said first inside surface forming a generally bell-shaped female surface and said second inside surface forming a generally pillar-shaped male surface with crown, said pillar-shaped male surface matingly conforming to said female surface with flowpath annularly converging therebetween, wherein said crown is surrounded by a radiused annular lip projecting into said flowpath, said projecting radiused annular lip with underside impactor surface for impactingly capturing said information-poor particles with elutriative assist, thereby excluding said informationally-poor particles from said suction airflow and conveying said informationally-rich particles over said radiused annular lip.

5. The omnidirectional sampling intake of claim 4, wherein said bell-shaped female surface encloses said pillar-shaped male surface and said crown of said pillar shaped male surface is formed with a radius and a collector duct descending centrally therethrough, said collector duct having fluid connection with said outlet port, and further wherein said bell shaped female surface is formed with a flow guide mated to said radius for acceleratingly directing streamlines around said crown and into said collector duct without separation eddy therein.

6. The omnidirectional sampling intake of claim 5, wherein said radius is extended for greater than 180 degrees of arc, thereby directing said streamlines along a flowpath that turns for greater than 180 degrees of arc.

7. The omnidirectional sampling intake of claim 5, wherein a particle concentrator or a particle collector is disposed in said collector duct.

8. The omnidirectional intake of claim 1, which is self-cleaning in wind or rain.

9. The omnidirectional intake of claim 8, wherein said inlet slot is configured with dimensions for passive flow-through ventilation with wind-driven scouring and gravitationally driven cleaning of said horizontal section and said first centrifugal impactor section.

* * * * *